(12) United States Patent
Franey (10) Patent No.: US 11,691,649 B2
(45) Date of Patent: Jul. 4, 2023

(54) SYSTEMS AND METHODS FOR DYNAMICALLY LIMITING ALTERNATE PICK LOCATION ATTEMPTS BEFORE SHORTING

(71) Applicant: 6 RIVER SYSTEMS, LLC, Waltham, MA (US)

(72) Inventor: Catherine Jones Franey, Waltham, MA (US)

(73) Assignee: 6 RIVER SYSTEMS, LLC, Waltham, MA (US)

(*) Notice: Subject to any disclaimer, the term of this patent is extended or adjusted under 35 U.S.C. 154(b) by 270 days.

(21) Appl. No.: 17/327,505

(22) Filed: May 21, 2021

(65) Prior Publication Data

US 2022/0371626 A1 Nov. 24, 2022

(51) Int. Cl.
*G06Q 10/087* (2023.01)
*B60W 60/00* (2020.01)
*G05D 1/02* (2020.01)

(52) U.S. Cl.
CPC .. *B60W 60/00256* (2020.02); *B60W 60/0011* (2020.02); *G05D 1/0212* (2013.01); *G06Q 10/087* (2013.01); *G05D 2201/0216* (2013.01)

(58) Field of Classification Search
CPC ........ B60W 60/00256; B60W 60/0011; G05D 1/0212; G06Q 10/087
See application file for complete search history.

(56) References Cited

U.S. PATENT DOCUMENTS

| | | | |
|---|---|---|---|
| 7,233,914 B1* | 6/2007 | Wijaya | G06Q 10/087 705/28 |
| 9,741,007 B1* | 8/2017 | Rouaix | G06Q 10/08 |
| 10,071,856 B2* | 9/2018 | Hance | B65G 1/0492 |
| 10,346,793 B2* | 7/2019 | Agarwal | G06Q 10/087 |
| 11,544,810 B2* | 1/2023 | Rao | G06Q 10/06315 |
| 2016/0125345 A1* | 5/2016 | Majumdar | G06F 16/24578 705/7.39 |
| 2019/0236740 A1* | 8/2019 | Rao | G06Q 50/28 |
| 2020/0380578 A1* | 12/2020 | Xu | G06Q 30/0631 |
| 2022/0237530 A1* | 7/2022 | Franey | G06Q 10/047 |

* cited by examiner

*Primary Examiner* — Ramsey Refai
(74) *Attorney, Agent, or Firm* — Foley & Lardner LLP (57) ABSTRACT

Disclosed are systems and methods for dynamically re-routing a pick path to an alternate pick location in response to identifying a shorted product at a pick location. The dynamic decision to re-route an autonomous vehicle is based on completion scores representing a likelihood of completing order in an autonomous vehicle, a maximum remaining time, an additional pick time, and order priorities. Based on various weights for factors of the orders, a system may re-route the autonomous vehicle to fulfill a shorted order at an alternate location when no orders have a high likelihood of completion, the additional pick time associated with re-routing the autonomous vehicle to the alternate pick location is less than the maximum remaining time for each order on the autonomous vehicle, and/or none of the orders on the autonomous vehicle have a higher priority than the shorted order.

21 Claims, 6 Drawing Sheets

SYSTEMS AND METHODS FOR DYNAMICALLY LIMITING ALTERNATE PICK LOCATION ATTEMPTS BEFORE SHORTING

TECHNICAL FIELD

This application relates generally to dynamically re-routing a pick path for an autonomous vehicle that is collecting products for multiple orders.

BACKGROUND

Autonomous vehicles in a warehouse guide pickers to pick products and place the products in specific containers (totes). Each container on the autonomous vehicle may be filled with products associated with one or more orders. A computer routes an autonomous vehicle to locations in the warehouse based on a pick path to fulfill all of the orders on the autonomous vehicle. In some cases, when the autonomous vehicle (and picker) arrive at a location, the picker is unable to pick the product. The product is considered to be shorted when the product is not available at that location (e.g., the product is missing or damaged). If a product associated with an order is shorted, then the order will not be fulfilled. If the picker attempts to cure the shorted product by picking the product at an alternate pick location in the warehouse, the additional time to pick from the alternate location may cause a delay in fulfilling other orders or even cause those orders to miss a deadline.

In conventional solutions, a computer may direct (or instruct, route) a picker to an alternate pick location. For example, a picker may be instructed to address the short by traveling to a first alternate pick location. If the short is still not resolved, the picker may be instructed to travel to a second alternate pick location. If the short is still not resolved, the picker may be instructed to pick a new product (e.g., the computer abandons the attempt to cure the shorted product). Such limited (static, predetermined) operating rules do not adequately address how to resolve a short when an autonomous vehicle is being used to pick multiple orders, particularly when each order may have different priorities and/or deadlines.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

There remains a desire to dynamically re-route a pick path for an autonomous vehicle collecting products for multiple orders. Dynamically re-routing the pick path advantageously improves processing efficiency and/or saves memory of a computer performing the re-routing. For example, instead of the computer performing computationally expensive routing instructions infrequently, the computer may perform frequent, minor, re-routing adjustments to a pick path by dynamically re-routing the pick path.

As an autonomous vehicle travels around a warehouse to fulfill multiple orders, a computer recalculates one or more completion scores that are representative of a measure of a likelihood of completing the orders on the autonomous vehicle. The completion score may represent a measure of a likelihood that an order will not be completed due to a shorted product.

If one of the orders for the autonomous vehicle has a short, the computer may weigh: the likelihood of successfully completing the order, the priorities (e.g., customer status, urgency of the order) of the different orders on the autonomous vehicle, the current position in the warehouse, deadlines of each of the orders, and the current time, to evaluate whether to seek the shorted product from an alternate pick location or whether to proceed with a shorted order (i.e. raise an exception).

I. Components and Operations of Illustrative Systems

Figure 1A:
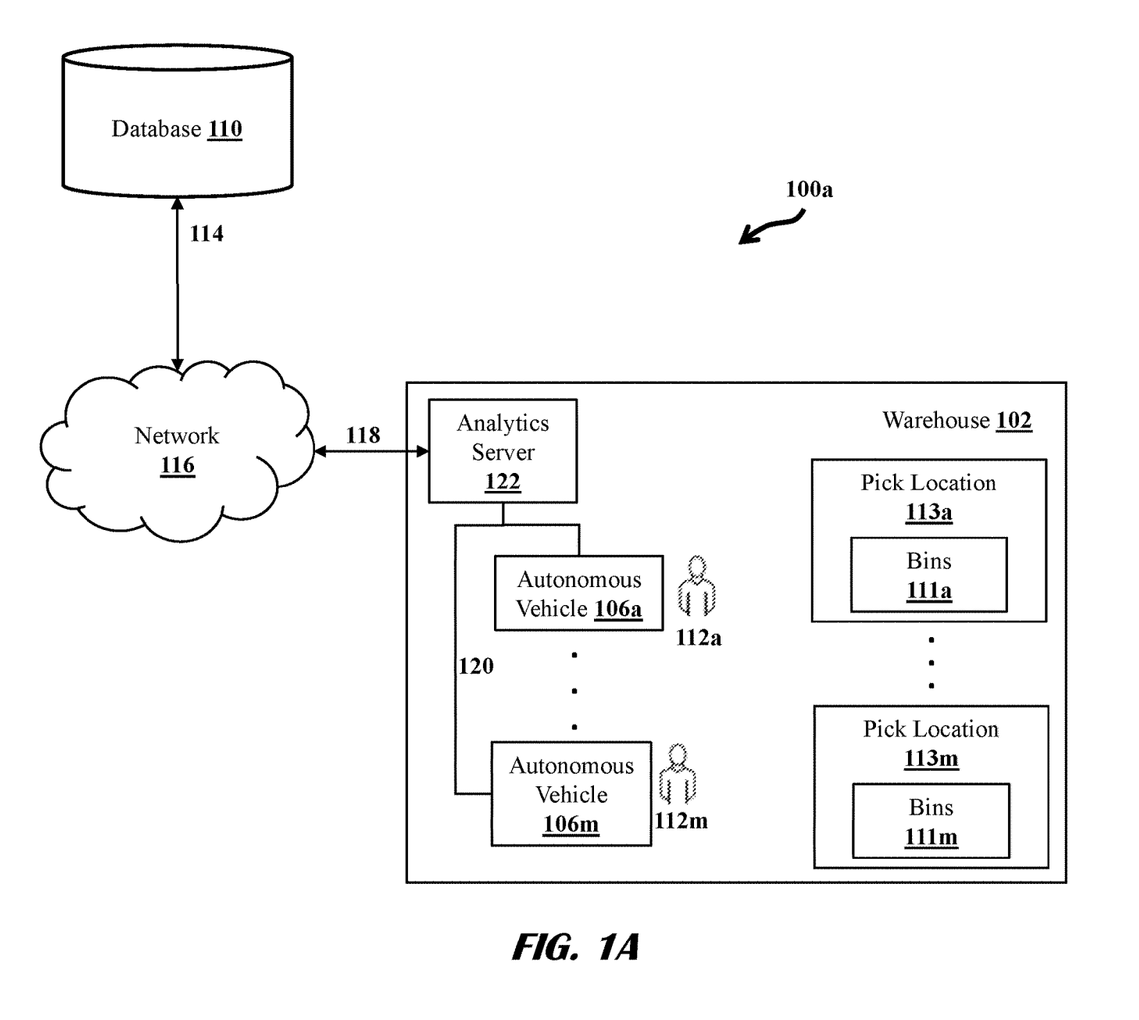
FIG. 1A shows a system for dynamically re-routing a pick path for an autonomous vehicle that is collecting products for multiple orders, according to an embodiment.

FIG. 1A illustrates a system 100*a* for dynamically re-routing a pick path for an autonomous vehicle that is collecting products for multiple orders, according to an embodiment. The system 100*a* includes a database 110 connected to a communications network 116. The communications network 116 connects to an analytics server 122 associated with a warehouse 102. The warehouse 102 may contain autonomous vehicles 106*a* to 106*m* (collectively referred to as autonomous vehicle(s) 106), pickers 112*a* to 112*m* (collectively referred to as pickers 112), pick locations 113*a* to 113*m* (collectively referred to as pick locations 113), and shelves/racks/bins 111*a* to 111*m* (collectively referred to as bin(s) 111). Embodiments may include or otherwise implement any number of devices capable of performing the various features and tasks described herein. For example, FIG. 1A shows the analytics server 122 as a distinct computing device in the warehouse 102. In some embodiments, the analytics server 122 may be located in a different warehouse or capable of communicating with analytics servers 122 in various warehouses. Embodiments may comprise additional or alternative components, or may omit certain components, and still fall within the scope of this disclosure.

The databases 110 store and manage data records of various products. For example, databases 110 may store product quantities, product locations, product shipping schedules, product manufacturer information, and the like. The products in the warehouse 102 may be held, sold, maintained, stored, or otherwise transferred through the warehouse 102. The warehouse 102 may include a product storage facility or shipping depot, for example, for transitioning foods or products from one facility to a next or to a customer location (e.g., house, office).

The database 110 may also store data records indicating a quantity of a product and a location of a product in the warehouse (e.g., in a bin 111 at a particular pick location 113). Some pick locations 113 contain bins 111 of one particular product. Some pick locations 113 contain bins 111 of multiple products. The database 110 may contain data records of the same product being stored in bins 111 in multiple pick locations 113.

The databases 110 may also store and manage data records of various customers. For example, customers have various priorities. An order associated with a high priority customer may be prioritized to be completed and/or shipped on time. The database 110 may also store data records carrier shipping schedules (e.g., times of day that various carriers arrive, days of the week that various carriers arrive). The database 110 may also store and manage data records of substitute products. Substitute product data may include customer preference data, customer rankings, and previous customer accepted substitutes.

The analytics server 122 may update data records in databases 110 in real time (or near real time) as products are being stocked and picked from pick locations 113 (including bins 111) in warehouse 102. Additionally or alternatively, the analytics server 122 may update data records in database 110 periodically (e.g., daily, monthly, quarterly). In some configurations, data records in database 110 are updated in response to trigger conditions (e.g., a shipment of a particular product arrives at the warehouse 102, a product is identified by a picker 112 as being out of stock).

The databases 110 are coupled via communications links 114, to communications network 116, and via communications link 118 to the analytics server 122 associated with the warehouse 102. The communications network 116 may be a public or private network, and the communications links 114, and 118 that connect to communications network 116 may be wired or wireless. Non-limiting examples of the communications network may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The analytics server 122 is associated with warehouse 102 and may be physically located at the warehouse 102 or located remotely from warehouse 102. In the schematic embodiment shown in FIG. 1A, the analytics server 122 is shown as being located in the warehouse 102, which may represent a physical and/or remote location of the analytics server 122 or its functionality, though the analytics server 122 may be located in a remote location. The analytics server 122 may be implemented as a distributed system or as a single device. In the case of a distributed system, one or more processors located outside the warehouse or in other devices may be, and sometimes are, used to perform one or more operations attributed to the analytics server 122 in this embodiment.

The analytics server 122 may generate instructions to retrieve one or more products in bins 111 from one or more pick locations 113 to complete an order or request from a customer (e.g., online order, pick list, customer's list, grocery list, shopping list). When the analytics server 122 receives an indication that a product in an order has shorted, the analytics server 122 may query the database 110 and retrieve pick locations 113 that store the same product. The analytics server 122 will instruct the picker to pick to product at the new pick location 113 by updating the pick path. Additionally or alternatively, the analytics server 122 may query the database 110 and retrieve other substitute products (and substitute product locations) to replace the product that has been shorted and update the pick path. Additionally or alternatively, the analytics server 122 may store a lookup table in local memory mapping acceptable substitute products of particular products, alternate pick locations of particular products, and the like. The instructions can indicate a pick path through the warehouse 102 and the locations within the warehouse for the picker 112 to find and collect products in orders.

The autonomous vehicle 106 may communicate with the analytics server 122 and/or the database 110. The autonomous vehicle 106 receives instructions from the analytics server 122 and executes the instructions to route the picker 112 to particular pick locations 113 in warehouse 102. The analytics server 122 may cause instructions to display on the autonomous vehicle 106. Additionally or alternatively, pickers 112 may utilize a wearable device (e.g., earpiece, glasses, watch, wrist computer) configured to receive instructions and/or the notification from the analytics server 122. In other embodiments, the autonomous vehicles 106 receive instructions and/or notifications from the analytics server 122 and transmit the instructions and/or notification to the pickers 112.

The instructions may include a plurality of tasks or units of work. The tasks may include picking at least one product (e.g., from a bin 111), a product identifier, a quantity of the product, and location data (e.g., pick location 113) for the respective product. The instructions may indicate the pick path (e.g., route) to pick products, location data identifying one or more locations (e.g., pick locations 113, bins 111 at a pick location 113) to pick products, product data identifying one or more products to be picked from particular bins 111, and corresponding order information (e.g., which products go in which containers/portions of containers on the autonomous vehicle 106).

The autonomous vehicle 106 may receive instructions from the analytics server 122 and display the pick path to the picker 112 assigned to the autonomous vehicle 106. The instructions routing the autonomous vehicle 106 may indicate an order (e.g., a sequence) to provide or display the tasks for the path such that the tasks for individual products are provided or displayed one at a time, for example, in sequential order through an interface on the autonomous vehicle 106. The instructions may interleave picking products of various orders (e.g., lists of products for particular customers) such that the picker's time picking products in warehouse 102 is minimized. The autonomous vehicle 106 may display, using the instructions, one individual task at a time as a picker 112 progresses through the path such that upon completion of a first task (e.g., first product at a first bin 111a at a first pick location 113a), the autonomous vehicle

106 displays a second task (e.g., a second product at a second bin 111*b* at the first pick location 113*a*, or a second product at a second bin 11*b* at a second pick location 113*b*).

While the picker 112 is being routed to a pick path, the analytics server 122 can dynamically revise (re-route) the path, for example, in response to a product being unavailable (e.g., shorted), and to incorporate an alternate pick location in the pick path (e.g., a product may be restocked at an alternate pick location, the alternate pick location may have surplus products). Additionally or alternatively, the analytics server 122 may incorporate a substitute product (e.g., at an alternate pick location) in the pick path. The analytics server 122 may dynamically revise the pick path to an alternate pick location based in part on one or more completion scores of multiple orders on the autonomous vehicle, a distance to the alternate pick location, a time to traverse to the alternate pick location, a priority of orders on the autonomous vehicle, and the like.

In some configurations, the analytics server 122 determines acceptable substitute products if a product has shorted. In determining acceptable substitute products, the analytics server 122 calculates acceptance probability scores (e.g., a likelihood that the user and/or customer will accept or agree to the available substitute product). The analytics server 122 may algorithmically or statistically determine acceptance probability scores using, for example, products, product classes, data associated with previous substitutions accepted by a user or group of users, previous substitutions accepted by one or more other users (e.g., similar users, group profile) and/or product ranking data.

The analytics server 122 can generate weighted scores for products and substitute products. The weighted score may include a combination of a distance metric and an acceptance probability score for a product and substitute product. The analytics server 122 can determine and assign a weight value to the distance metric, acceptance probability score and/or product characteristics based in part on user preferences, store or retailer preferences and/or the characteristics of the missing product.

The autonomous vehicle 106 may communicate with the analytics server 122 to provide product status information (e.g., whether a product at a pick location 113 has shorted), completion of tasks (e.g., product picks) associated with the pick path, and receive routing instructions for navigating through the warehouse 102 to bins 111 at pick locations 113. In some configurations, the autonomous vehicle 106 may communicate with the database 110 to provide offline access to inventory data, product data, and/or substitute product data.

The analytics server 122 can choose an alternate pick location 113 to pick the shorted product based in part on one or more completion scores representing a measure of a likelihood of completing (fulfilling) the orders in the autonomous vehicle 106. The likelihood may be based on a number of picks left in the order, a likelihood of successful picks (e.g., an amount of inventory existing and an amount of inventory required to fulfill the order, a likelihood that a particular product of an order will be available at a location on the pick path), and an order fulfillment status (e.g., whether a portion of the order is in a different container and the status of that container, including whether an order in that container has shorted). The analytics server 122 may calculate completion scores and balance order completion and efficiency.

The analytics server may measure completion (fulfillment) of an order based on various order attributes. In one configuration, completion of an order occurs when the order has arrived at a packing station so that the order can be packaged for a delivery service. In another configuration, completion of an order occurs when an autonomous vehicle has completed the pick path. In yet another configuration, completion of an order occurs when the order has been provided to the delivery service.

In order to set a time for completion, the analytics server may use one of these order completion scenarios and then add time as necessary for the autonomous vehicle and other actions (e.g., unpacking the autonomous vehicle). In an example, if the analytics server is aiming to complete an order to provide it to a delivery service by 3:00 PM, the analytics server may set a deadline for the autonomous vehicle to complete the pick path by 2:30 PM to give additional time for the packing station and other operations.

Based on various weightings for factors of the orders, the analytics server 122 may re-route the autonomous vehicle 106 to fulfill a shorted order at an alternate pick location 113 when no orders on the autonomous vehicle 106 have a high likelihood of completion, the additional pick time associated with re-routing the autonomous vehicle 106 to the alternate pick location is less than the maximum remaining time for each of the orders on the autonomous vehicle 106, or none of the orders on the autonomous vehicle have a higher priority than the shorted order.

The analytics server 122 also communicates with databases 110, autonomous vehicles 106, and devices associated with pickers 112 (e.g., mobile phones, personal data assistants (PDA), tablet computers, handheld scanners, or wearable devices). The communications may include retrieving, updating, and routing (or re-routing).

Figure 1B:
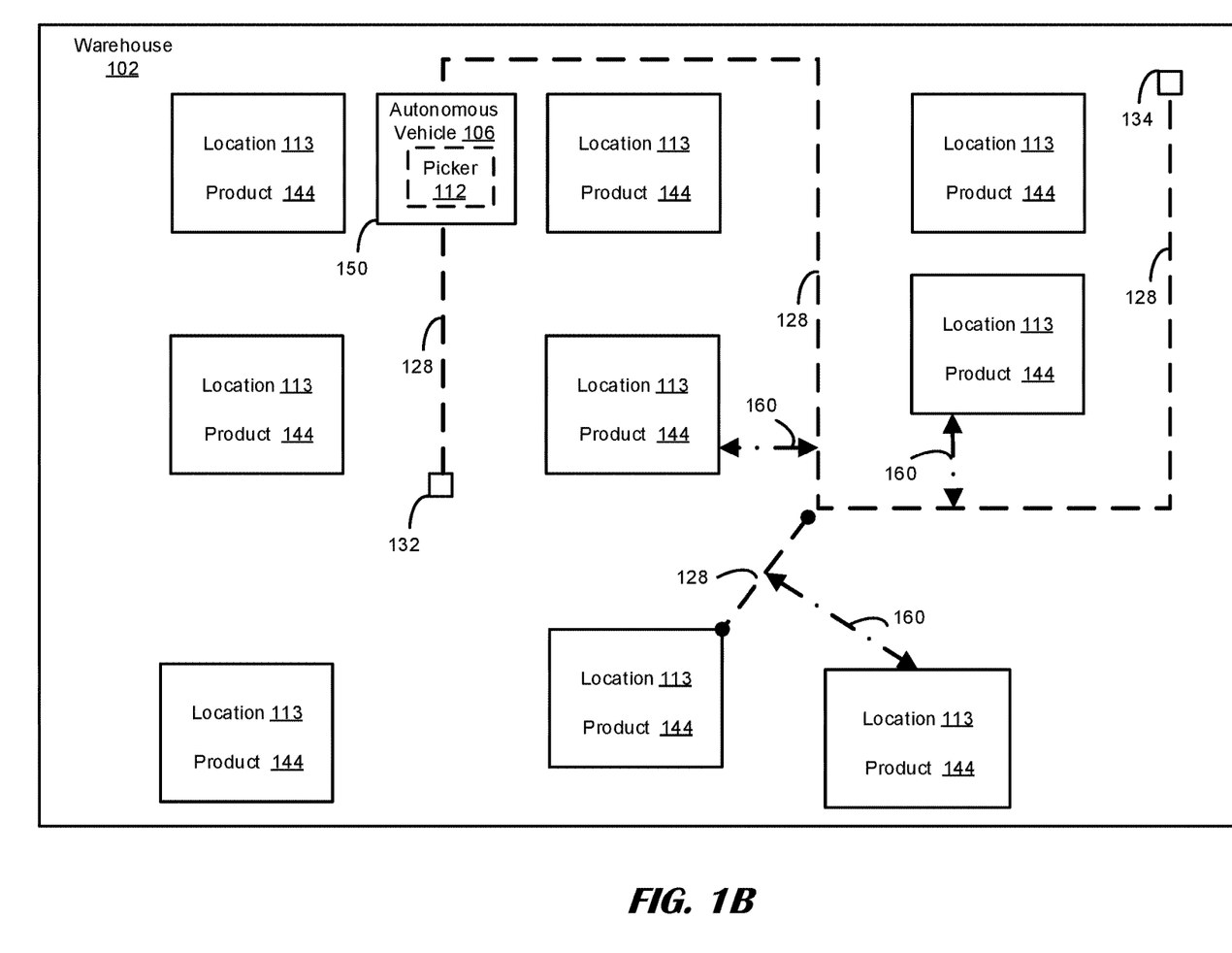
FIG. 1B illustrates a diagram of a pick path through a warehouse with various pick locations, according to an embodiment.

FIG. 1B illustrates a diagram of a pick path 128 through a warehouse 102 with various pick locations 113. The pick path 128 can include or correspond to an original or initial path generated based on the pick locations 113 of orders. The pick path 128 can provide a route through the warehouse 102 for an autonomous vehicle 106 to follow to select or retrieve the corresponding products. The pick path 128 may correspond to a minimal or smallest total distance for the autonomous vehicle 106 to travel through the warehouse 102 to select and/or retrieve the products for one or more orders from the different pick locations 113 within the warehouse 102.

The autonomous vehicle 106 can execute the instructions to collect the products in a determined order, for example, sequential order based in part on a position with the pick path 128, a current location 150 in the warehouse 102, and/or a location of a product at a pick location 113.

For example, the autonomous vehicle 106 can execute instructions for a first location 113 for a first product 144 and wait to execute instructions for a second location 113 for a second product 144 until the autonomous vehicle 106 receives an indication that the first product 144 has been picked. Additionally or alternatively, the autonomous vehicle 106 may receive an indication that the first product 144 is unavailable and/or damaged. The pick path 128 can include a starting point 132 and an end point 134 with each of the pick locations 113 at different points along the path 128. It should be appreciated that the pick path 128 can include a single location 113 or multiple locations 113 (e.g., two or more) with the number of pick locations 113 determined based in part on a number of products 144 picked for one or more orders.

The autonomous vehicle 106 can execute the instructions and traverse the pick path 128 selecting and retrieving the corresponding products 144 from the respective locations 113. In some embodiments, a second product 144 may be unavailable at the second location 113. For example, the autonomous vehicle 106 can determine that the second product 144 included in pick path 128 is not at the indicated second location 113 (e.g., the product shorted). A product may short if the product is sold out, stock depleted, damaged, or otherwise not available for a customer at an expected product location (e.g., the second location 113). If the product is shorted, the autonomous vehicle 106 (or picker) may transmit a notification or otherwise inform a server (e.g., the analytics server 122) of the shorted product. The warehouse 102 may store the product at other locations 113 such that the autonomous vehicle 106 can attempt to cure the shorted order at an alternate location 113.

In response to an indication of a short from the autonomous vehicle 106, the analytics server 122 may calculate a completion score using a revised pick path 128 that routes to an alternate pick location 113. The completion score associated with the alternate pick location 113 is representative of a prediction (or likelihood) of an extent to which the orders will be fulfilled when considering a revised pick path that includes the alternate pick location 113. The completion score for each alternate pick location 113 may be determined based on an amount of inventory existing at the alternate pick location, an amount of inventory required to fulfill the order, whether there is sufficient time to travel to the alternate pick location 113 before any deadlines, or other factors. The analytics server 122 determines an amount of time to travel to alternate pick locations 113 by estimating a deviated distance 160 from the current pick path 128 to reach the alternate location. The deviated distance is converted to time units based on the picker's walking pace and the estimated deviated distance 160. The picker's walking pace may be specific to that particular picker 112 (obtained by the server via metrics retrieved from wearable technology, historic picker 112 order completion time information), or an average walking pace.

The analytics server 122 may dynamically re-route the pick path 128 for the autonomous vehicle 106 based on a comparison of the overall completion score (of all orders on the autonomous vehicle 106, including the order with the shorted product) without re-routing the pick path 128 for the autonomous vehicle 106 (e.g., abandoning an effort to fulfill the shorted product) and the overall completion score at each alternate pick location (e.g., attempting to cure the shorted product). That is, the analytics server 122 computes a first completion score without re-routing the pick path 128 and a second completion score assuming the autonomous vehicle 106 travels to the alternate pick location 113. The analytics server 122 balances fulfilling the order at the alternate pick location 113 with the remaining time to fulfill that order and the other orders, a status of other orders, and the priority of other orders. The computer may determine the remaining time based on a current time and at least one of a ship-by-time, a carrier cut-off time, or a different deadline.

For example, the analytics server 122 may determine that the autonomous vehicle 106 should be directed to an alternate pick location when the completion score for the orders accounting for the alternate pick location is higher than the completion score for the orders with a shorted order.

Additionally or alternatively, the analytics server 122 may determine a substitute product for the shorted product and evaluate pick locations (or alternate pick locations) associated with picking the substitute product. The substitute product can include a product in the same product class (e.g., different type of peanut butter, different type of juice), a product having different properties, or a different type of product from the missing product. The substitute product can include available products at the warehouse having the same or similar functionality, characteristics, and/or ingredients to the shorted product. The analytics server 122 can access metadata for the one or more available products 144 to determine if the available products are a proper substitute for the shorted product.

The analytics server 122 can generate instructions to revise the pick path 128 to include the alternate pick locations for the products 144 in the revised pick path 128. While the autonomous vehicle 106 travels along the pick path 128 collecting the remaining products 144, the analytics server 122 can dynamically revise the pick path 128 to incorporate the alternate pick location based on the completion scores, the priorities of the orders, and/or the time associated with re-routing the autonomous vehicle 106. The analytics server 122 can transmit instructions for the revised path 128 to the autonomous vehicle 106. In some embodiments, the autonomous vehicle 106 can dynamically update, using the instructions, the display of the revised pick path 128 to include the alternate pick location, for example, for a picker 112 traversing the pick path 128 with the autonomous vehicle 106. The revised pick path 128 can include the alternate pick location as a next location 113 in the revised pick path 128 or as a future location 113 in the revised pick path 128. The autonomous vehicle 106 can continue to execute the instructions for the pick path 128 and generate one or more notifications indicating a status of remaining product(s) in remaining order(s) in the pick path 128 until the pick path 128 is completed or until each of the products 144 available to be selected are collected by the autonomous vehicle 106. The autonomous vehicle 106 and analytics server 122 can continue to monitor the progress of the pick path 128 and, if requested, can dynamically select an alternate pick location for shorted product and update the pick path 128 to include the alternate pick location.

II. Autonomous Vehicles

A worker (e.g., picker) may pick products from bins or shelves at particular locations in a warehouse or other storage facility and load the picked products on an autonomous vehicle. The picker may also travel with an autonomous vehicle to one or more packing (also called packout) stations such that the products on the autonomous vehicle may be unloaded and packed for shipping. The picker may also travel with the autonomous vehicle to one or more healing stations such that containers containing orders with shorted products may be removed from the autonomous vehicle and the containers (and associated orders) may be integrated into pick paths of other autonomous vehicles. The healing station may take alternative action to otherwise cure a shorted order.

The system can be configured for robotics to replace or assist the pickers. In some implementations, a robotic autonomous vehicle may move autonomously throughout the warehouse or storage facility. When moving autonomously, the autonomous vehicle can move alongside a picker or independently of a picker to locations in the warehouse. In other implementations, the robotic autonomous vehicle can pick products from bins or shelves and load the picked products onto the autonomous vehicle. The robotic autonomous vehicle may also place products from the autonomous vehicle onto bins or shelves.

As shown in FIG. 1A, autonomous vehicles 106 are located in the warehouse 102 and controlled by the analytics server 122 via communications link 120. Pickers 112 may work alongside the autonomous vehicles 106 to perform operations (e.g., pick products from bins 111 in the warehouse 102 and place those products in the autonomous vehicle 106, replenish bins 111 in the warehouse by stocking products on the bins using the products in an autonomous vehicle 106, and remove products from the autonomous vehicle 106 such that the products may be unloaded and packaged for shipping). In the example used herein, the autonomous vehicle is robotic and has autonomous operation based on instructions communicated from the analytics server 122. In some embodiments, the autonomous vehicle may be manually operated by a worker, who may push, pull, drive, or otherwise move the autonomous vehicle around the warehouse 102. For example, the autonomous vehicle may have a shopping cart configuration. A manually-operated autonomous vehicle may still use other components for communicating with the analytics server 122 and the picker 112, such as a screen for communicating information to the picker 112 from the analytics server 122.

Figure 2A:
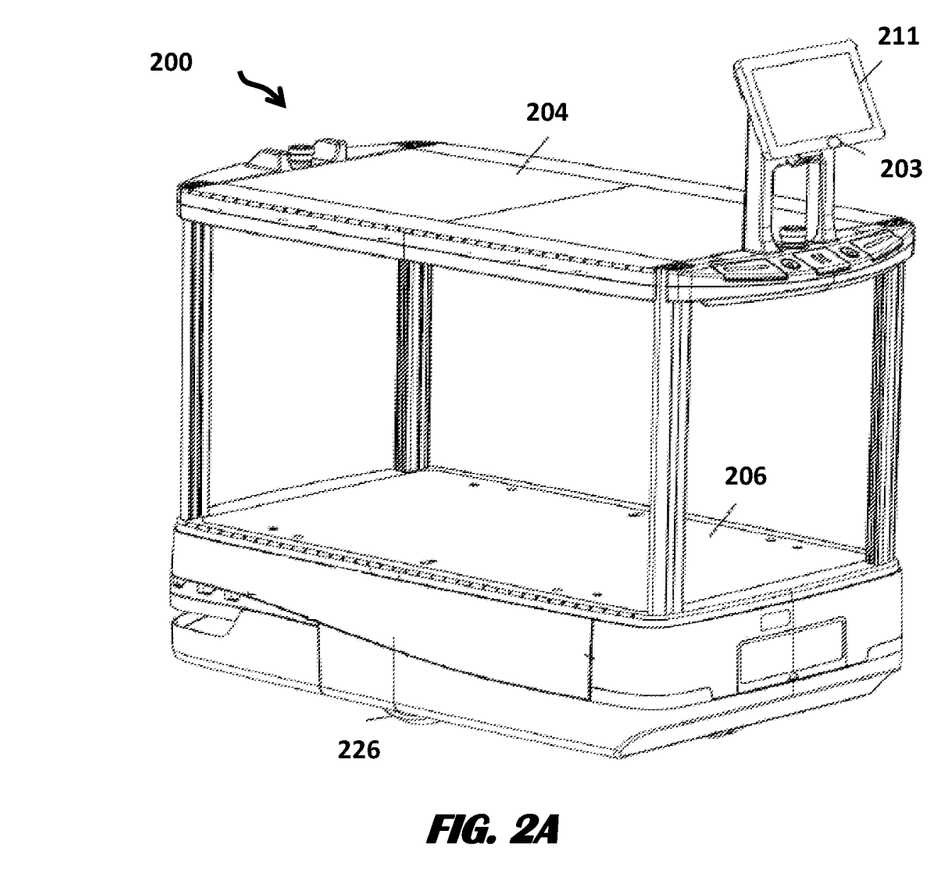
FIG. 2A shows an autonomous vehicle, according to an embodiment.

FIG. 2A shows an autonomous vehicle 200, according to an embodiment. The autonomous vehicle 200 has wheels 226, display 211, speaker 203 and two shelves 204, 206. In some instances, weighing scales (not shown) may be incorporated into the shelves 204, 206. For instance, the shelves may include pressure plates. The autonomous vehicle 200, through notifications displayed on display 211 and/or audio instructions provided via speaker 203, may notify a worker of the total weight of products on the shelves 204, 206 (e.g., the weight of the products on each shelf 204 and 206 respectively, the weight of combined shelves 204, 206). One or more totes (as described in FIG. 2C) can be, and sometimes are, transported on each of the shelves 204, 206 of the autonomous vehicle 200. The scales may have a tare feature such that the weight of totes on the scales can be zeroed. Eliminating the weight of the tote on the scale allows the analytics server to determine the weight of the products in the tote.

While a two-shelf autonomous vehicle embodiment is shown, multiple autonomous vehicle configurations are possible, with some autonomous vehicles being implemented using a single shelf while other autonomous vehicles have two or more shelves. Each of the totes on the autonomous vehicle may have several levels (layers, zones) for storing and transporting the picked products.

The autonomous vehicle 200 may be configured to determine product dimensions. For instance, a weighing autonomous vehicle may utilize shelves 204, 206 with scales to weigh the products. Additionally or alternatively, a measuring autonomous vehicle may carry one or more measuring devices (e.g., augmented reality measurement tools, rulers, measuring tape) and/or be configured with an imaging system such that the processor (230 in FIG. 2C) on the autonomous vehicle may determine the size of the product (e.g., depth, width, height). For example, the processor may perform object recognition to measure the product such that the imaging processing may recognize a product and even distinguish it from a hand of a picker. In some instances, the processor may support object recognition capabilities and/or be capable of executing the imaging system. The processor may determine the dimensions of the product and communicate the product dimensions to the analytics server (122 in FIG. 1A). Additionally or alternatively, the analytics server may receive image data (raw data, compressed data) from the imaging system and perform object recognition to determine the dimensions of the products placed on the autonomous vehicle 200. The autonomous vehicle 200 may be configured for both weighing products and measuring the sizes of products.

The autonomous vehicle 200, through visual instructions displayed on display 211 and/or audio instructions provided via speaker 203, may transmit an instruction to place one or more products on an inspection station. For example, a picker assigned to an autonomous vehicle 200 may receive instructions from the autonomous vehicle 200 to pick a product to be inspected on route to a location (e.g., such as an inspection station, a subsequent product location, etc.) Additionally or alternatively, an administrator (using a management console, for instance), may trigger an inspection. That is, a management console or other administrative device may transmit an instruction (via display 211, speaker 203, and/or wearable devices worn by the picker) to place one or more products on an inspection station, place one or more products on an autonomous vehicle 200 on route to a location, and the like.

The autonomous vehicle 200 may also act as the inspection station. Inspection stations may also include designated areas of the warehouse in which a product is weighed and/or measured. Additionally or alternatively, the autonomous vehicle 200, through visual instructions displayed on display 211 and/or audio instructions provided via speaker 203, may transmit an instruction to measure one or more products using equipment in the warehouse (e.g., measuring tape, rulers, or scales).

Figure 2B:
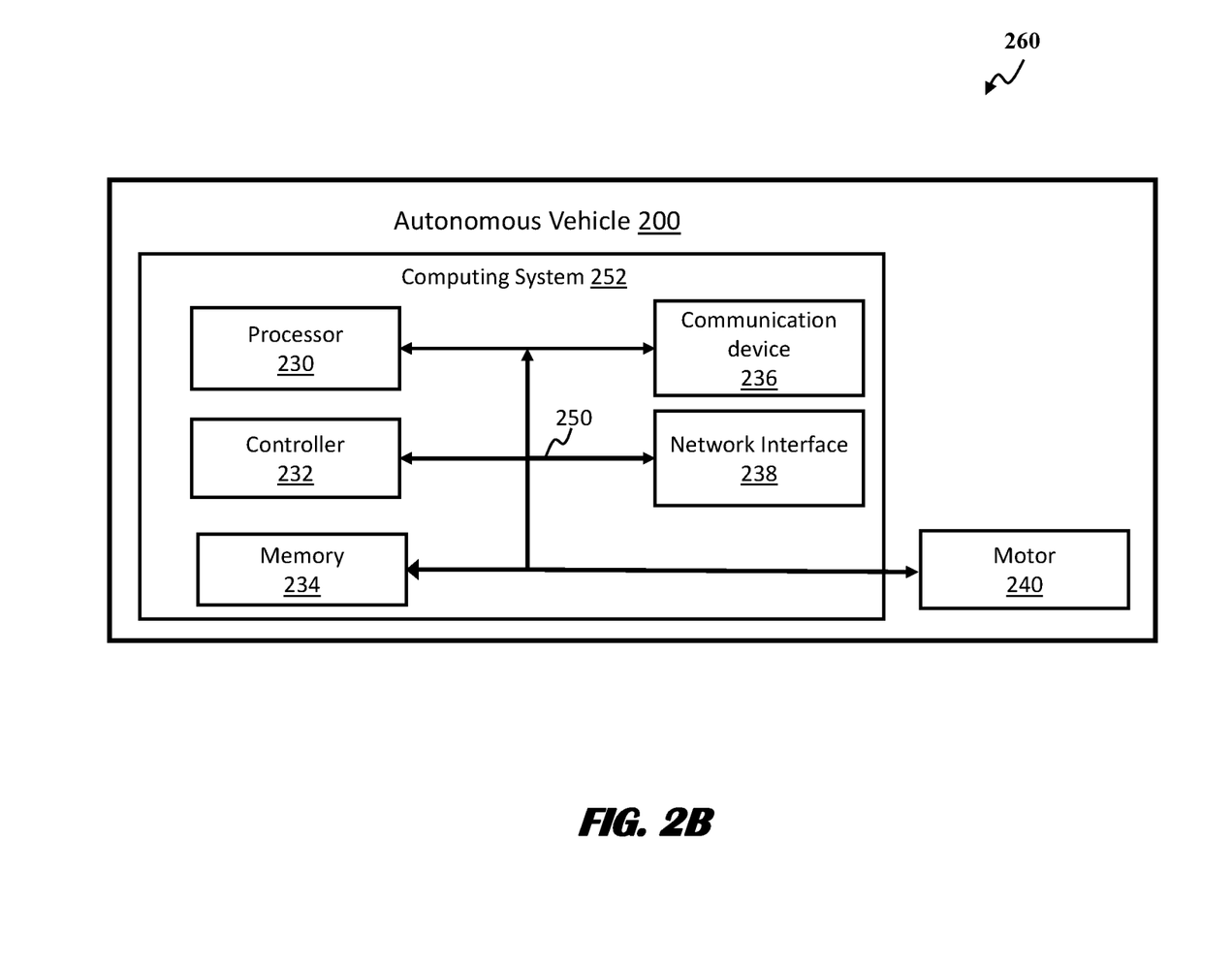
FIG. 2B shows a block diagram of an autonomous vehicle system that may be used in implementing the systems and methods described herein, according to an embodiment.

FIG. 2B shows a block diagram of an autonomous vehicle system 260 that may be used in implementing the systems and methods described herein, according to an embodiment. The computing system 252 of an autonomous vehicle 200 may include a processor 230, a controller 232, a memory 234, a communication device 236, and a network interface 238. The autonomous vehicle 200 may also include a motor 240. Each of the components 230, 232, 234, 236, 238, and 240 may be interconnected, for example, using a system bus 250. General-purpose computers, network appliances, mobile devices, or other electronic systems may also include at least portions of the computing system 252.

The computing system 252 may receive and/or obtain information about a customer order (e.g., from the analytics server), including a list of products, the dimensions of the products, the weight of the products, characteristics of the products (a fragility score, a hazard score), the priority of the order relative to other orders, the target shipping date, the carrier pick up time, whether the order can be shipped incomplete (without all of the ordered items) and/or in multiple shipments, etc.

The controller 232 may be configured to send control signals to the motor 240 and/or other components of the autonomous vehicle 200 as described further herein. The motor 240 may be configured to convert electrical energy received from an electrical power source (e.g., battery, super capacitor, etc.) into rotations of the wheels (226 in FIG. 2B). The motor 240 propels the autonomous vehicle 200 such that the autonomous vehicle 200 moved autonomously and does not require being pushed or pulled by a human or other force.

The memory 234 stores information within the computing system 252. In some implementations, the memory 234 is a non-transitory computer-readable medium. In some implementations, the memory 234 is a volatile memory unit. In some implementations, the memory 234 is a non-volatile memory unit.

The memory 234 may store warehouse operation information. The warehouse operation information may include documented product dimensions, tote capacity (e.g., weight limit, product count limit), shelf capacity (e.g., weight limit, product count limit), and bin capacity (e.g., weight limit, product count limit). The memory 234 may also store product information such as a product name, a product description, a product image, and product storage location.

The processor 230 is capable of processing instructions for execution within the computing system 252. In some implementations, the processor 230 is a single-threaded processor. In some implementations, the processor 230 is a multi-threaded processor. The processor 230 is capable of processing instructions stored in the memory 234.

The processor 230 in the autonomous vehicle 200 (and/or the analytics server 122 in FIG. 1A) controls the autonomous vehicle's 200 movement to/from one location (e.g., pick location) to the next location (e.g., unloading station, subsequent pick location). The processor may be in communication with controller 232 and/or motor 240. In the event the autonomous vehicle 200 becomes associated with a different worker (e.g., a worker at an unloading station or a second picker taking over picking for the first picker), the autonomous vehicle 200 may require the second worker to log in to the autonomous vehicle 200 (e.g., via the touch screen 211 in FIG. 2A) prior to the autonomous vehicle 200 providing guidance as to the next operation performed by the second worker.

In some implementations, at least a portion of the approaches described herein may be realized by instructions that upon execution cause one or more processing devices to carry out the processes and functions described herein. Such instructions may include, for example, interpreted instructions such as script instructions, or executable code, or other instructions stored in a non-transitory computer readable medium.

The network interface 238 may be configured to receive and transmit messages and/or instructions. The network interface 238 may be a wireless network interface capable of receiving commands and information from the analytics server and sending information (e.g., product locations) to the analytics server via wireless signals.

The network interface 238 may be configured to process signals from the analytics server and/or other autonomous vehicles in the warehouse. The network interface 238 may be, for instance, an Ethernet card, a serial communication device, e.g., an RS-232 port, and/or a wireless interface device, e.g., an 802.11 card, a 3G wireless modem, or a 4G wireless modem.

Figure 2C:
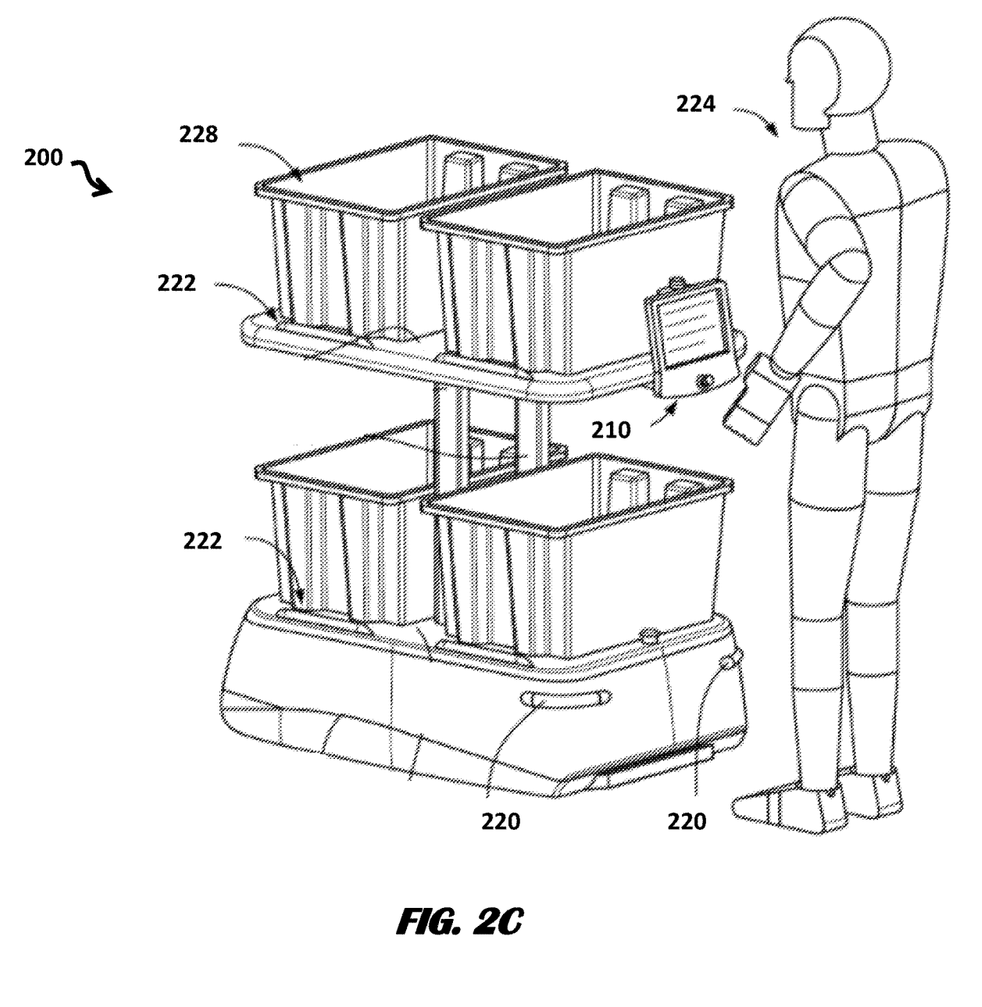
FIG. 2C shows an autonomous vehicle configured with multiple containers, according to an embodiment.

FIG. 2C shows the autonomous vehicle 200 configured with multiple containers 228, according to an embodiment. The autonomous vehicle 200 may display on screen 211 instructions for a picker 224. The instructions may instruct the picker 224 to travel to locations in the warehouse, search for particular bins at a particular location for particular products, and place products in the containers 228 or remove products from the containers 228 (e.g., unload at a particular bin/shelf). The picker 224 may place (or remove) the product in a particular container 228 based on lights 222, 220 indicating the particular tote. That is, the lights 222, 220 may illuminate, directing the picker 224 to place (or remove) the product in the indicated container 228. Additionally or alternatively, the display 211 may display instructions instructing the picker 224 which container 228 to place (or remove) the products.

Additionally or alternatively, one or more imaging systems (e.g., scanners) may operate in conjunction with (or replace) lights 220, 222. The imaging system may be used to measure the dimensions of products as the products enter the container. For example, object recognition may be performed to recognize a product and even distinguish it from a hand of a picker 224. As discussed herein, the processor (230 in FIG. 2B) may support object recognition capabilities and/or be capable of executing the imaging system. Additionally or alternatively, the analytics server (122 in FIG. 1) may receive image data (raw data, compressed data) from the imaging system and perform object recognition to determine the dimensions of the products entering the containers 228. The imaging systems may confirm whether a product has been placed into the container. If the product is not placed into the container, the analytics server may determine that the product is shorted.

The display 211 and/or speaker may instruct the picker 224 to place the product directly on the autonomous vehicle 200. In such a scenario, the picker 224 may not load or operate the autonomous vehicle 200 with four containers 228. Rather, the picker 224 may load the autonomous vehicle 200 with two containers 228, for instance, and reserve space on the autonomous vehicle 200 for large or bulky products.

III. Illustrative Methods of Operation

Figure 3:
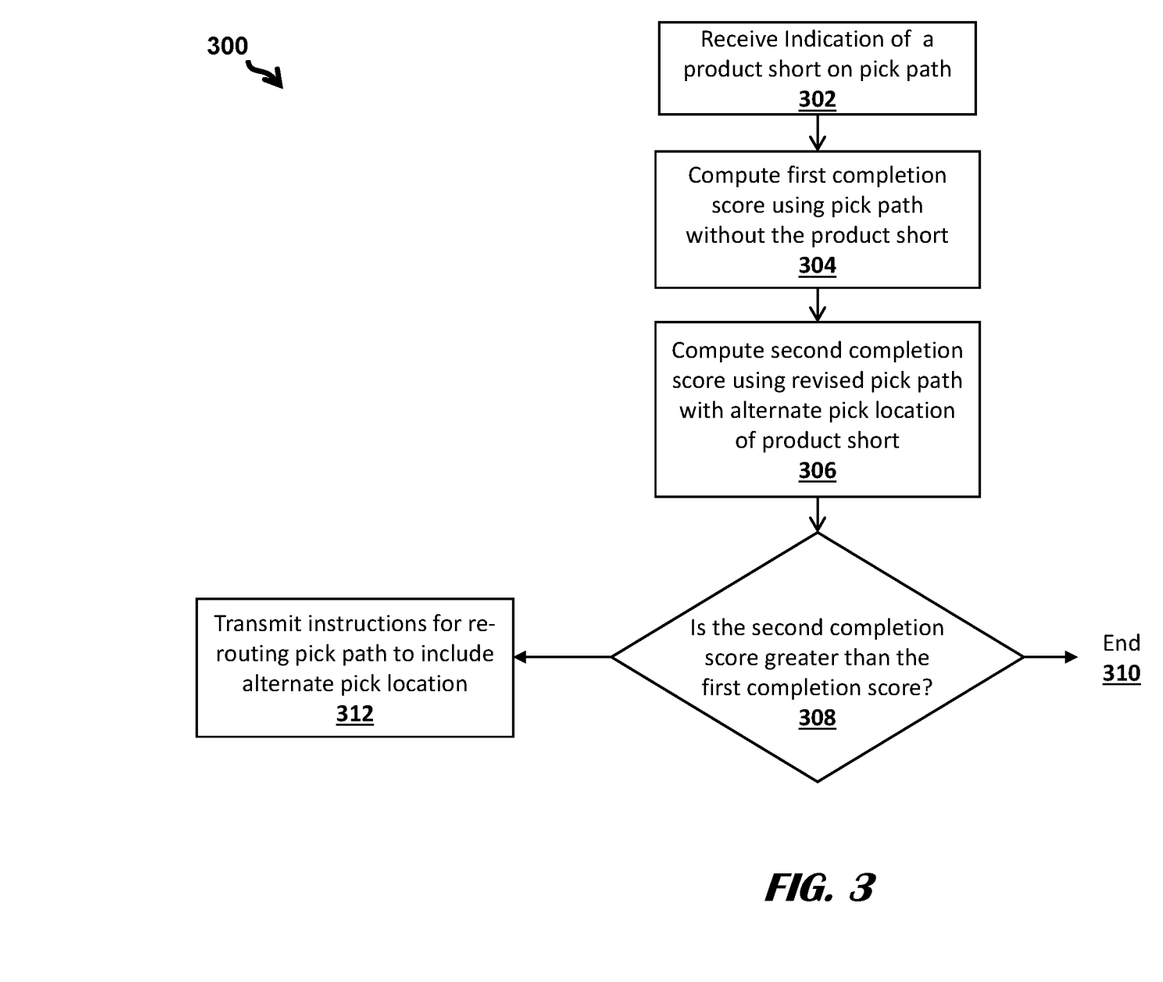
FIG. 3 shows execution operations of a method for dynamically determining whether to re-route an autonomous vehicle to an alternate pick location in response to a product short, according to an embodiment.

FIG. 3 shows operations of executing a method 300 for dynamically determining whether to re-route an autonomous vehicle to an alternate pick location in response to a product short, according to an embodiment. The method may be implemented by an analytics server (or other computing device) associated with the warehouse and executes machine-readable software code for exception detection and re-routing an autonomous vehicle based on weighing the likelihood of successfully completing the order, the priorities (e.g., customer status, urgency of the order) of the different orders on the autonomous vehicle, the current position in the warehouse (e.g., where the autonomous vehicle is in a predetermined pick path), deadlines, and the current time. Some embodiments may include additional, fewer, or different operations than those described in the method 300 and shown in FIG. 3. The various operations of the method 300 may be performed by one or more processors executing on any number of computing devices.

An order includes at least one product. The autonomous vehicle may be configured to hold one or more containers, where each container is configured to contain products associated with one or more orders. Additionally or alternatively, products associated with one or more orders may be placed directly on the autonomous vehicle.

Containers associated with multiple orders may be associated with (assigned to, carried on) an autonomous vehicle. For example, orders may be grouped in a container and associated with an autonomous vehicle based on deadlines (e.g., each of the orders to be picked using the autonomous vehicle must be shipped by 3 pm tomorrow). Order may also be grouped in a container and associated with an autonomous vehicle based on products (e.g., each of the products to be picked using the autonomous vehicle are perishable). Additionally or alternatively, one container may be associated with one order.

Orders may also be grouped in multiple containers associated with multiple autonomous vehicles (e.g., the order is shared by multiple autonomous vehicles). For example, an order may have perishable products and non-perishable products. The products of the order associated with the perishable products may be associated with (e.g., assigned to) a first autonomous vehicle and picker picking up perishable products of one or more other orders. The products of the order associated with the non-perishable products may be associated with a second autonomous vehicle and picker.

The analytics server may determine an initial pick path based in part on the products associated with each of the orders. In some configuration, the initial pick path is based in part on the distance of each of the products stored at product locations in the warehouse. For example, the analytics server may determine the initial pick path based on minimizing the time that the picker spends in the warehouse. That is, the analytics server may determine the initial pick path based on minimizing the distance that the work travels in the warehouse.

In operation 302, the analytics server may receive an indication of a short of a product on a pick path. The shorted product may be considered an exception (e.g., a deviation from standard and/or normal operations). A short of a product may occur when the product is not available (e.g., sold out, stock depleted) in a particular bin (or shelf) at a particular location in the warehouse. In some instances, the product may be available, but the product may be considered shorted if the product is damaged or unsuitable for delivery for a customer. The product may be available at one or more other bins and/or locations in the warehouse.

The analytics server may receive the input from a picker or the autonomous vehicle. The picker may identify a product short such that the analytics server receives an input from the picker indicating the shorted product. The picker can input the short into a handheld computer, wrist computer or wearable computer, or other electronic device in communication with the autonomous vehicle and/or the server. The picker may input into the autonomous vehicle that a product was not obtained, and the autonomous vehicle may transmit a notification or other data indicating that the product was a short. In another configuration, the autonomous vehicle may expect a container to weigh a certain amount after a product has been picked. Additionally or alternatively, the analytics server may indicate that a product short has occurred. The analytics server may identify a shorted product if the container does not reach the expected weight (e.g., the product was not placed into the container).

Upon identifying the short for the product, an indication can be generated and/or transmitted. The analytics server may store a record of the order wherein a product in that order is listed as not obtained. In one example, each product of the order may have a status of obtained, not yet obtained, or was not obtained. As the products of an order are obtained or as the system recognizes shorts, the records may be updated accordingly. For those items where the product was not obtained (e.g., due to a short), the system may determine whether to seek the product from an alternate location.

The analytics server may generate a notification to verify that the product short is not the result of an error or accident. For instance, in the event that 25 products are expected to be currently available at a particular shelf, the analytics server may generate a notification to confirm a count of the products on the shelf and confirm whether 25 products are on the shelf. This notification may be sent to the picker associated with the product short and/or a supervisor.

In operation 304, the analytics server computes a first completion score for each order in an autonomous vehicle using the pick path without the shorted product. The completion score may be based on a number of picks left for the order. For example, the completion score based on a number of picks left for the order will be different if a first product in the order has been picked vs the last product in the order has been picked. The completion score may also be based on an amount of inventory existing at a particular location in a warehouse and an amount of inventory required for the order. For example, the completion score of an order requiring three pens from a location in a warehouse that has 1000 pens (e.g., a small likelihood of a product short) will be different from a completion score of an order requiring three pairs of jeans from a location in a warehouse that has exactly three pairs of jeans (e.g., a high likelihood of a product short). The completion score may also be based on the status of other containers associated with the order. For example, the analytics server may determine that an order should be filled using different containers on different autonomous vehicles (e.g., the order containing perishable products and non-perishable products as discussed herein). The completion score of an order with multiple autonomous vehicles actively picking products in the warehouse may be different from the completion score of an order with half of the order actively being picked by an autonomous vehicle and half of the order inactively being picked (e.g., the autonomous vehicle has not been sent into the warehouse yet).

The analytics server will determine the first completion score for each order in an autonomous vehicle based on continuing along the initially determined pick path. Accordingly, the order with the shorted product will not be fulfilled (or completed) because of the shorted product.

In operation 306, the analytics server computes a second completion score for each order in the autonomous vehicle using a revised pick path. The revised pick path includes picking up the shorted product at an alternate pick location. The alternate pick location in the warehouse is an alternate location in the warehouse that stores at least the product that has just been identified (e.g., operation 302) as shorted. The alternate pick location may also include a location in the warehouse to drop off a container (or a portion of picked products) or a healing station.

Additionally or alternatively, the location in the warehouse of the alternate pick location may be a location to meet a different autonomous vehicle and/or picker (e.g., a handoff location). For example, the autonomous vehicle carrying the container associated with an order with a shorted product may transfer the picked products for that order to a different autonomous vehicle. The different autonomous vehicle will have different orders and/or time constraints such that the different autonomous vehicle may attempt to fulfill picking the shorted product at an alternate pick location in the warehouse.

In some configurations, the analytics server will query a database (e.g., database 110 in FIG. 1A) and retrieve multiple alternate pick locations in the warehouse. The analytics server may compute the second completion score for each order in the autonomous vehicle, based on each of the alternate pick locations in the warehouse. If the analytics server receives four alternate pick locations in the warehouse, a second completion score for each order may be computed four times (e.g., one completion score calculation for each alternate pick location). Additionally or alternatively, the analytics server may compute the second completion score for a portion of the received alternate pick locations. For example, the analytics server may compute the second completion score for one alternate pick location out of the four alternate pick locations received. The analytics server may determine the one alternate pick location based on the alternate pick location closest to the current location of the autonomous vehicle or some other factor.

The analytics server may compute the second completion score according to the same factors (e.g., number of picks left for the order, the amount of inventory existing at a particular location in a warehouse and an amount of inventory required for the order, the status of other containers associated with the order).

The analytics server may also compute a completion score associated with each alternate pick location. For example, the completion score associated with an alternate pick location may be based on the amount of inventory existing at the alternate pick location in the warehouse and an amount of inventory required for the order.

The analytics server may also compute an additional pick time required for one or more of the received alternate pick locations. The additional pick time may be an estimate of the deviated distance from the current pick route to reach the alternate pick location. The analytics server may determine additional pick times for alternate pick locations by aggregating pick times for one or more alternate pick locations. For example, the analytics server may sum the additional pick time required to travel to a first alternate pick location and a second alternate pick location. The deviated distance may be converted into time units based on the picker's walking pace (or an average walking pace).

The analytics server may also compute a maximum time remaining (the time remaining to complete the order) for each order based on a current time. The analytics server may determine that an order is completed (fulfilled) based on picking each of the products identified in the order. Additionally or alternatively, the maximum time remaining may include the time to pick and/or pack the order (e.g., prepare the order for shipment by unloading the products from the autonomous vehicle and packing the products for shipment). The maximum remaining time for the order may also depend on a ship-by time (e.g., a time that the order may be packed and ready to be shipped such that the order arrives to the customer by the promised time). Additionally or alternatively, the maximum remaining time for the order may depend on a carrier cut-off time (e.g., each carrier may set a timing deadline based on the last time of the day the carrier will be at the warehouse).

The analytics server may also determine a priority associated with each order. For example, customers may be identified as being VIP customers. An order associated with a VIP customer may be associated with a higher priority than an order associated with an average customer. Additionally or alternatively, orders with perishable products may be associated with a higher priority than an order without perishable products. Additionally or alternatively, the analytics server may determine a priority of an order based on the urgency of the order. The analytics server may compare the maximum time remaining to one or more thresholds. For example, the analytics server may assign an order a high priority if the maximum time remaining is one hour as compared to the priority of an order if the maximum time remaining is 24 hours.

In decision 308, the analytics server compares the first completion score and the second completion score. The analytics server compares the first completion score and the second completion score to evaluate an extent to which each of the orders associated with the autonomous vehicle will be fulfilled. The fulfillment of the orders may depend on the time period (e.g., picking products before the maximum remaining time). The fulfillment or orders may also depend on a state of the warehouse inventory (e.g., whether there are enough products in the warehouse to fulfill orders).

In some configurations, the analytics server may compare the first completion score and a weighted arrangement (or combination) of factors including: the second completion score, completion scores associated with one or more alternate pick locations, additional pick times, maximum remaining times, and priorities of each of the orders. In some configurations, the analytics server may compare some combination of additional pick times, maximum remaining times, and priorities of each of the orders (e.g., the analytics server may not compute a completion score).

For example, the analytics server may compare the completion scores (before and after re-routing the autonomous vehicle to attempt to fulfill the shorted product at an alternate pick location) and priorities of each of the orders. The analytics server may also compare the completion scores (before and after re-routing the autonomous vehicle to attempt to fulfill the shorted product at an alternate pick location) and the maximum remaining time (time remaining to complete an order). The analytics server may compare the maximum remaining time to the additional pick time and determine to attempt to fulfill the shorted product at an alternate pick location if the maximum remaining time is greater than the additional pick time (e.g., operation 310).

The analytics server may statistically or algorithmically determine weights for the factors based on, for example, minimizing the effect of re-routing the autonomous vehicle on high priority orders, maximizing the completion score of one or more orders, and minimizing the number of orders delayed based on the maximum time remaining. Additionally or alternatively, a user (such as a supervisor) may input weights for each of the factors in the weighted arrangement.

In this example, the second completion score (e.g., the completion score including the effect of picking a product at an alternate pick location) of the order with the shorted product is greater than the first completion score (e.g., the completion score including the effect of not picking the product at an alternate pick location) of any of the other orders associated with the autonomous vehicle. In operation 312, in response to the first completion score being less than the second completion score, the analytics server may, for example, transmit instructions for re-routing the autonomous vehicle using a revised pick path that includes the alternate pick location.

Additionally or alternatively, the analytics server may determine to transmit instructions for re-routing the autonomous vehicle if at least one of no other orders on the autonomous vehicle have a higher priority, the additional pick time is less than the maximum time remaining for each of the orders associated with the autonomous vehicle, or no other orders associated with the autonomous vehicle have a higher completion score.

In operation 310, in response to the first completion score being greater than the second completion score, the analytics server may not revise the pick path to include the alternate pick location. The autonomous vehicle will complete the remaining pick requests with a shorted order.

The autonomous vehicle may encounter more than one shorted product of one or more orders on a pick path, and compare the first and second completion score to determine whether to maintain the current path (operation 310) or re-route (operation 312). The determination in operation 308 can occur numerous times on the pick path, so the autonomous vehicle may, for example, re-route for a first shorted product and then maintain the pick path for a second shorted product.

For example, the analytics server may determine not to revise the pick path and end alternate pick location attempts (e.g., accepting the shorted order) if an order associated with the autonomous vehicle has a higher first completion score than a second completion score of a different order, and the priority of the first order is higher than the different order. Additionally or alternatively, the analytics server may determine not to revise the pick path and end alternate pick location attempts if any order associated with the autonomous vehicle has a maximum time remaining less than the additional pick time In some configurations, if the analytics server determines not to revise the pick path to include the alternate pick location based on the comparison of the completion score (and/or other factors), the analytics server may abandon the effort to fulfill the shorted product. In other configurations, the analytics server may temporarily abandon the effort to fulfill the shorted product. One or more triggers may cause the analytics server to reevaluate picking the shorted product at an alternate pick location. As a result, even though the autonomous vehicle does not route to an alternate pick location upon identifying a shorted product, the autonomous vehicle may later route to the alternate pick location. Such a situation may occur if the timing changes or a re-routing causes the autonomous vehicle to be closer than originally expected to the alternate pick location.

A trigger may be a temporal trigger. For example, every 15 minutes or 30 minutes, the analytics server may reevaluate the effect of picking the shorted product at an alternate pick location on the other orders associated with the autonomous vehicle. The analytics server may compare a first completion score to one or more second completion scores, additional time to alternate pick locations, maximum remaining times, and the like.

Triggers may also include pick events. Pick events include identifying a product as shorted (e.g., operation 302), picking a product for an order, and/or stopping the autonomous vehicle at a pick location. If the analytics server identifies a pick event, the analytics server may attempt to fulfill shorted products (including any new shorted product and/or any previous shorted products).

The analytics server may calculate a first completion score (e.g., a completion score based on the initial pick path) for each order associated with the autonomous vehicle. The analytics server may then query a database and retrieve alternate pick locations. The alternate pick locations may be locations that include a shorted product, the shorted product and other previously shorted products, locations to meet other autonomous vehicles and transfer (handoff) containers associated with one or more orders, and the like. The analytics server may calculate one or more second completion scores (e.g., completion scores based on one or more alternate pick locations for one or more shorted products) for each order associated with the autonomous vehicle.

In response to comparing one or more first and second completion scores associated with each order, the analytics server may transmit instructions for re-routing the pick path to include the alternate location of a second autonomous vehicle. The analytics server may transmit instructions for the first autonomous vehicle to meet the second autonomous vehicle if: the second autonomous vehicle has space for a transfer of a container (containing products of the order with the shorted product), the second autonomous vehicle has space in a container for products associated with the shorted product, the second autonomous vehicle is already routed for picking products associated with the order associated with the shorted product, or the like.

In some configurations, the analytics server may route the first autonomous vehicle to a location of the second autonomous vehicle. In some configurations, the analytics server may compute one or more completion scores for each of the orders associated with the second autonomous vehicle. The completion score for each of the orders associated with the second autonomous vehicle may be computed according to the same factors as the first and/or second completion scores (e.g., number of picks left for the order, the amount of inventor existing at a particular location in a warehouse and an amount of inventory required for the order, the status of other containers associated with the order). The analytics server may also compute additional pick times, maximum remaining times, and identify priorities of each of the orders associated with the second autonomous vehicle.

In some configurations, the analytics server may re-route both the first and second autonomous vehicles upon comparing completion scores, additional pick times, maximum remaining times, priorities, and the like. That is, the analytics server may transmit instructions to both the first and second autonomous vehicles to meet at a location (in the warehouse, at a packing station, at a healing station).

Additionally or alternatively, depending on the completion scores, additional pick times, maximum remaining times, and priorities, the analytics server may re-route only the second autonomous vehicle. For example, the second autonomous vehicle may receive instructions from the analytics server to travel to an alternate pick location and pick a product for the order associated with the first autonomous vehicle (the product previously being identified as shorted). In some configurations, depending on the capacity (or the expected capacity and/or fill volume) of containers on the autonomous vehicle, the analytics server may not re-route the second autonomous vehicle (because the second autonomous vehicle may be instructed according to an initial pick path) but instead update the pick list associated with orders on the second autonomous vehicle. The analytics server may update the pick list of the second autonomous vehicle such that the picker associated with the second autonomous vehicle picks the product.

Triggers may also include picking products for orders. For example, each time a product is picked and placed in a container on the autonomous vehicle, the analytics server may reevaluate the effect of picking one or more previously shorted products on other orders based on comparing the completion score and/or other factors involving re-routing the pick path to one or more alternate pick locations.

In one embodiment, a computer-implemented method may comprise in response to receiving an indication of a short of a product from an autonomous vehicle routing on a pick path for a plurality of orders: computing, by a computer, a first completion score for the plurality of orders using the pick path without the product; and computing, by the computer, a second completion score for the plurality of orders using a revised pick path that includes an alternate pick location for the product; and in response to comparing the first completion score to the second completion score, transmitting, by the computer to the autonomous vehicle, instructions configured to re-route the autonomous vehicle using the revised pick path.

Triggering inspection of the particular product may include generating, by the computer, a notification that the dimension change suspicion score associated with the particular product in the container exceeds the threshold; and transmitting, by the computer, the notification to a device for triggering the inspection of the particular product.

The method may further comprise determining to use the revised pick path based on comparing the first completion score to the second completion score and based on comparing a first priority of a first order of the plurality of orders affected by the short of the product to a second priority of a second order of the plurality of orders not affected by the short of the product.

The method may further comprise determining to use the revised pick path based on comparing the first completion score to the second completion score and based on a time remaining to complete an order of the plurality of orders.

The instructions may be configured to re-route using the revised pick path of the autonomous vehicle when the time remaining to complete the order is greater than an additional time for the alternate pick location.

Computing the first completion score may comprise computing, by the computer, a likelihood that a particular product of the plurality of orders will be available at a location on the pick path.

The method may further comprise receiving, by the computer, an indication of a short of a second product of at least one order of the plurality of orders obtained by the autonomous vehicle; re-computing, by the computer, the first completion score using the pick path; and re-computing, by the computer, the second completion score for the revised pick path using the alternate pick location.

The first completion score and the second completion score may correspond to predictions of extents to which the plurality of orders will be fulfilled within a time period.

A second autonomous vehicle may have instructions for a portion of the plurality of orders, and further comprising determining to use the revised pick path based on comparing the first completion score to the second completion score and based on a third completion score for the portion of the plurality of orders of the second autonomous vehicle.

The method may further comprise in response to receiving an indication of a second short from the autonomous vehicle routing on the revised pick path for the plurality of orders: computing, by the computer, a third completion score for the plurality of orders using the revised pick path; and computing, by the computer, a fourth completion score for the plurality of orders using a second revised pick path that includes a second alternate pick location; and in response to comparing the third completion score to the fourth completion score, determining, by the computer, transmit instructions configured to route the autonomous vehicle using the revised pick path.

The method may further comprise determining to use the revised pick path based on at least one of comparing the first completion score to the second completion score, comparing a first priority of a first order of the plurality of orders affected by the short of the product to a second priority of a second order of the plurality of orders not affected by the short of the product, or comparing a time remaining to complete the order and an additional time for the alternate pick location.

In another embodiment, a system may comprise a transceiver configured to transmit instructions to an autonomous vehicle; and a server comprising a processor configured to: in response to receiving an indication of a short of a product from the autonomous vehicle routing on a pick path for a plurality of orders: compute a first completion score for the plurality of orders using the pick path without the product; and compute a second completion score for the plurality of orders using a revised pick path that includes an alternate pick location for the product; and in response to comparing the first completion score to the second completion score, transmitting, to the autonomous vehicle, instructions configured to re-route the autonomous vehicle using the revised pick path.

The processor may be further configured to determine to use the revised pick path based on comparing the first completion score to the second completion score and based on comparing a first priority of a first order of the plurality of orders affected by the short of the product to a second priority of a second order of the plurality of orders not affected by the short of the product.

The processor may be further configured to determine to use the revised pick path based on comparing the first completion score to the second completion score and based on a time remaining to complete an order of the plurality of orders.

The instructions may be configured to re-route using the revised pick path of the autonomous vehicle when the time remaining to complete the order is greater than an additional time for the alternate pick location.

Computing the first completion score may comprise computing a likelihood that a particular product of the plurality of orders will be available at a location on the pick path.

The processor may be further configured to receive an indication of a short of a second product of at least one order of the plurality of orders obtained by the autonomous vehicle; re-compute the first completion score using the pick path; and re-compute the second completion score for the revised pick path using the alternate pick location.

The first completion score and the second completion score may correspond to predictions of extents to which the plurality of orders will be fulfilled within a time period.

A second autonomous vehicle may have instructions for a portion of the plurality of orders, and the processor may be further configured to determine to use the revised pick path based on comparing the first completion score to the second completion score and based on a third completion score for the portion of the plurality of orders of the second autonomous vehicle.

Determining to use the revised pick path may be based on at least one of comparing the first completion score to the second completion score, comparing a first priority of a first order of the plurality of orders affected by the short of the product to a second priority of a second order of the plurality of orders not affected by the short of the product, or comparing a time remaining to complete an order and an additional time for the alternate pick location.

The processor may be further configured to, in response to receiving an indication of a second short of a second product from the autonomous vehicle routing on the revised pick path for the plurality of orders: compute, by the computer, a third completion score for the plurality of orders using the revised pick path without the second product; and compute, by the computer, a fourth completion score for the plurality of orders using a second revised pick path that includes a second alternate pick location for the second product; and in response to comparing the third completion score to the fourth completion score, determine, by the computer, transmit instructions configured to route the autonomous vehicle using the revised pick path.

In yet another embodiment, a non-transitory machine-readable storage medium having computer-executable instructions stored thereon that, when executed by one or more processors, may cause the one or more processors to perform operations comprising: in response to receiving an indication of a short of a product from an autonomous vehicle routing on a pick path for a plurality of orders: computing, by a computer, a first completion score for the plurality of orders using the pick path without the product; and computing, by the computer, a second completion score for the plurality of orders using a revised pick path that includes an alternate pick location for the product; and in response to comparing the first completion score to the second completion score, transmitting, by the computer to the autonomous vehicle, instructions configured to re-route the autonomous vehicle using the revised pick path.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    in response to receiving an indication of a short of a product from an autonomous vehicle routing on a pick path for a plurality of orders:
        computing, by a computer, a first completion score for the plurality of orders using the pick path without the product; and
        computing, by the computer, a second completion score for the plurality of orders using a revised pick path that includes an alternate pick location for the product; and
    in response to comparing the first completion score to the second completion score, transmitting, by the computer to the autonomous vehicle, instructions configured to re-route the autonomous vehicle using the revised pick path.

2. The method of claim 1, further comprising determining to use the revised pick path based on comparing the first completion score to the second completion score and based on comparing a first priority of a first order of the plurality of orders affected by the short of the product to a second priority of a second order of the plurality of orders not affected by the short of the product.

3. The method of claim 1, further comprising determining to use the revised pick path based on comparing the first completion score to the second completion score and based on a time remaining to complete an order of the plurality of orders.

4. The method of claim 3, wherein the instructions are configured to re-route using the revised pick path of the autonomous vehicle when the time remaining to complete the order is greater than an additional time for the alternate pick location.

5. The method of claim 1, wherein computing the first completion score comprises computing, by the computer, a likelihood that a particular product of the plurality of orders will be available at a location on the pick path.

6. The method of claim 1, further comprising:
receiving, by the computer, an indication of a short of a second product of at least one order of the plurality of orders obtained by the autonomous vehicle;
re-computing, by the computer, the first completion score using the pick path; and
re-computing, by the computer, the second completion score for the revised pick path using the alternate pick location.

7. The method of claim 1, wherein the first completion score and the second completion score correspond to predictions of extents to which the plurality of orders will be fulfilled within a time period.

8. The method of claim 1, wherein a second autonomous vehicle has instructions for a portion of the plurality of orders, and further comprising determining to use the revised pick path based on comparing the first completion score to the second completion score and based on a third completion score for the portion of the plurality of orders of the second autonomous vehicle.

9. The method of claim 1, further comprising:
in response to receiving an indication of a second short from the autonomous vehicle routing on the revised pick path for the plurality of orders:
computing, by the computer, a third completion score for the plurality of orders using the revised pick path; and
computing, by the computer, a fourth completion score for the plurality of orders using a second revised pick path that includes a second alternate pick location; and
in response to comparing the third completion score to the fourth completion score, determining, by the computer, transmit instructions configured to route the autonomous vehicle using the revised pick path.

10. The method of claim 1, further comprising determining to use the revised pick path based on at least one of comparing the first completion score to the second completion score, comparing a first priority of a first order of the plurality of orders affected by the short of the product to a second priority of a second order of the plurality of orders not affected by the short of the product, or comparing a time remaining to complete an order and an additional time for the alternate pick location.

11. A system comprising:
a transceiver configured to transmit instructions to an autonomous vehicle; and
a server comprising a processor configured to:
in response to receiving an indication of a short of a product from the autonomous vehicle routing on a pick path for a plurality of orders:
compute a first completion score for the plurality of orders using the pick path without the product; and
compute a second completion score for the plurality of orders using a revised pick path that includes an alternate pick location for the product; and
in response to comparing the first completion score to the second completion score, transmitting, to the autonomous vehicle, instructions configured to re-route the autonomous vehicle using the revised pick path.

12. The system of claim 11, wherein the processor is further configured to determine to use the revised pick path based on comparing the first completion score to the second completion score and based on comparing a first priority of a first order of the plurality of orders affected by the short of the product to a second priority of a second order of the plurality of orders not affected by the short of the product.

13. The system of claim 11, wherein the processor is further configured to determine to use the revised pick path based on comparing the first completion score to the second completion score and based on a time remaining to complete an order of the plurality of orders.

14. The system of claim 13, wherein the instructions are configured to re-route using the revised pick path of the autonomous vehicle when the time remaining to complete the order is greater than an additional time for the alternate pick location.

15. The system of claim 11, wherein computing the first completion score comprises computing a likelihood that a particular product of the plurality of orders will be available at a location on the pick path.

16. The system of claim 11, wherein the processor is further configured to:
receive an indication of a short of a second product of at least one order of the plurality of orders obtained by the autonomous vehicle;
re-compute the first completion score using the pick path; and
re-compute the second completion score for the revised pick path using the alternate pick location.

17. The system of claim 11, wherein the first completion score and the second completion score correspond to predictions of extents to which the plurality of orders will be fulfilled within a time period.

18. The system of claim 11, wherein a second autonomous vehicle has instructions for a portion of the plurality of orders, and the processor may be further configured to determine to use the revised pick path based on comparing the first completion score to the second completion score and based on a third completion score for the portion of the plurality of orders of the second autonomous vehicle.

19. The system of claim 11, wherein determining to use the revised pick path based on at least one of comparing the first completion score to the second completion score, comparing a first priority of a first order of the plurality of orders affected by the short of the product to a second priority of a second order of the plurality of orders not affected by the short of the product, or comparing a time remaining to complete an order and an additional time for the alternate pick location.

20. The system of claim 11, wherein the processor is further configured to:
in response to receiving an indication of a second short of a second product from the autonomous vehicle routing on the revised pick path for the plurality of orders:
computing, by the computer, a third completion score for the plurality of orders using the revised pick path without the second product; and
computing, by the computer, a fourth completion score for the plurality of orders using a second revised pick path that includes a second alternate pick location for the second product; and
in response to comparing the third completion score to the fourth completion score, determining, by the computer, transmit instructions configured to route the autonomous vehicle using the revised pick path.

21. A non-transitory machine-readable storage medium having computer-executable instructions stored thereon that, when executed by one or more processors, cause the one or more processors to perform operations comprising:
  in response to receiving an indication of a short of a product from an autonomous vehicle routing on a pick path for a plurality of orders:
    computing, by a computer, a first completion score for the plurality of orders using the pick path without the product; and
    computing, by the computer, a second completion score for the plurality of orders using a revised pick path that includes an alternate pick location for the product; and
  in response to comparing the first completion score to the second completion score, transmitting, by the computer to the autonomous vehicle, instructions configured to re-route the autonomous vehicle using the revised pick path.

* * * * *